United States Patent [19]

Ohi

[11] Patent Number: 4,502,853
[45] Date of Patent: Mar. 5, 1985

[54] ROTATIONAL SPEED SENSOR FOR VANE COMPRESSORS

[75] Inventor: Shinichi Ohi, Konan, Japan

[73] Assignee: Diesel Kiki Co., Ltd., Tokyo, Japan

[21] Appl. No.: 580,100

[22] Filed: Feb. 14, 1984

[30] Foreign Application Priority Data

Feb. 22, 1983 [JP] Japan .............. 58-24723[U]

[51] Int. Cl.³ .................. G01P 3/487; F01C 21/00
[52] U.S. Cl. ............................... 418/2; 417/42; 324/167; 324/174
[58] Field of Search .............. 418/2; 417/42; 324/166, 324/167, 174, 179

[56] References Cited

U.S. PATENT DOCUMENTS

| 3,898,563 | 8/1975 | Erisman | 324/166 |
| 4,331,918 | 5/1982 | Dunch | 324/174 |
| 4,393,966 | 7/1983 | Kono | 417/42 |

FOREIGN PATENT DOCUMENTS

| 2158097 | 5/1973 | Fed. Rep. of Germany | 418/2 |
| 56-64183 | 6/1981 | Japan. | |
| 57-56759 | 4/1982 | Japan. | |
| 57-59170 | 4/1982 | Japan. | |

Primary Examiner—Richard E. Gluck
Attorney, Agent, or Firm—Frishauf, Holtz, Goodman & Woodward

[57] ABSTRACT

In a vane compressor, a rotational speed sensor for sensing the rotational speed of the rotor comprises a permanent magnet embedded in an end face of the rotor, a pin formed of a ferromagnetic material, rigidly fitted in a pump housing accommodating the rotor, with its one end disposed to encounter the permanent magnet, and a magnetically sensing element disposed opposite the other end face of the pin.

7 Claims, 2 Drawing Figures

ROTATIONAL SPEED SENSOR FOR VANE COMPRESSORS

BACKGROUND OF THE INVENTION

This invention relates to a rotational speed sensor for sensing the rotational speed of a vane compressor.

Vane compressors are widely employed as refrigerant compressors in air coolers for vehicles and other air conditioners, by virtue of their compact sizes. A typical vane compressor of this kind comprises a pump housing formed by a cam ring having an endless camming inner peripheral surface and opposite side blocks secured to opposite ends of the cam ring, and a rotor received within the pump housing and carrying vanes radially movably disposed for sliding contact with the endless camming inner peripheral surface of the cam ring. As the rotor rotates, pump working chambers are defined between adjacent ones of the revolving vanes, the inner wall faces of the pump housing, and the outer peripheral surface of the rotor, wherein pumping actions are performed for suction, compression and discharge of refrigerant. The vane compressor constructed as above is driven by an engine by means of coupling means such as an electromagnetic clutch.

In a vane compressor employing an electromagnetic clutch as such coupling means, the rotational speed of the rotor does not always exactly correspond to the rotational speed of the engine due to slippage of the electromagnetic clutch, making it impossible to detect with accuracy the rotational speed of the rotor from that of the engine. This makes it difficult to achieve accurate control of the compressor, that is, control of the air conditioner.

A vane compressor of the above type has not a few sliding rotating parts. As a consequence, when the compressor is operating at a very high rotational speed in a condition where a reduced amount of refrigerant with lubricating oil mixed therein is present within the compressor, some sliding rotating parts such as the rotor can become short of necessary oil films, resulting in seizure of the rotor, etc., and even in breakdown of the compressor.

Therefore, to reduce the possibility of a trouble of this kind to a minimum, it is necessary to detect the actual rotational speed of the compressor as accurately as possible. However, so far as the present inventor knows, almost no rotational speed sensor for vane compressors which fully satisfies this requirement has so far been proposed.

On the other hand, in the field of swash plate type compressors which are also widely used in air conditioners, a rotational speed sensor has been proposed by Japanese Provisional Patent Publication No. 56-64183 which comprises a sensor of the electromagnetic type arranged in the cylinder block at such a location as to encounter a predetermined portion of the outer peripheral surface of the swash plate each time the swash plate makes one rotation to sense the rotational speed of the swash plate, or which comprises a sensor of the same type arranged in a cylinder bore at such a location as to encounter a recess formed in the outer peripheral surface of a piston received in the cylinder bore to sense a reciprocating motion of the same piston driven by the swash plate and thereby sense the rotational speed of the swash plate. Another rotational speed sensor for swash plate type compressors has been proposed by Japanese Provisional Patent Publication No. 57-59170 which comprises a sensor of the electromagnetic type disposed opposite the outer periphery of the swash plate to encounter a magnetic material such as an iron piece embedded in the outer peripheral surface of the swash plate each time the swash plate makes one rotation to sense the rotational speed of the swash plate.

However, vane compressors are basically different in structure from swash plate compressors such that the above proposed rotational speed sensors cannot be directly applied to the former. Further, the sensor proposed by the former publication makes it an essential requisite that the swash plate or the piston should be formed of a magnetic material.

Among rotational speed sensors for sensing the rotational speed of a rotary shaft applicable to machinery in general, a rotational speed sensor has been proposed by Japanese Provisional Patent Publication No. 57-56759 which comprises a sensor of the electromagnetic type arranged in the housing of a machine and disposed opposite an end of a rotary shaft to encounter a channel diametrically centrally formed across the end face of the rotary shaft each time the latter makes one rotation to sense the rotational speed of the rotary shaft. However, to apply this proposed sensor to a vane compressor, the compressor has to be designed large in axial size, which fails to meet a recent demand for designing vane compressors of this kind compact in size.

Moreover, it is a recent tendency that in order to reduce the weight of vane compressors, main parts of a vane compressor such as the pump housing and the rotor are made of nonferrous metals or light alloys, e.g. an aluminum base alloy. Since such materials are nonmagnetic materials or low magnetic permeability materials, it is almost impossible to apply the aforementioned proposed rotational sensors to vane compressors in a manner of utilizing the magnetism of the rotor for sensing the rotational speed of same.

Besides, in view of the structure of a vane compressor adapted to compress refrigerant to a very high pressure, consideration should be given to the location of the sensor body of a rotational speed sensor applied to the compressor so as not for the sensor body to be exposed to the high pressure refrigerant, to ensure a long life of the sensor.

SUMMARY OF THE INVENTION

It is an object of the invention to provide a rotational speed sensor which is adapted for use in a vane compressor of which the main parts such as the rotor and the pump housing are formed of nonmagnetic materials, and is capable of sensing the rotational speed of the rotor with high accuracy.

It is a further object of the invention to provide a rotational speed sensor for a vane compressor, which is arranged to be free from the influence of the high pressure refrigerant discharged from the compressor, thereby having a long life.

It is another object of the invention to provide a rotational speed sensor for vane compressors, which is simple in construction and low in manufacturing cost.

It is still another object of the invention to provide a vane compressor which is equipped with the rotational speed sensor stated in the preceding objects.

According to a rotational speed sensor of the invention, a permanent magnet is embedded in an end face of the rotor of the compressor. A pin formed of a ferromagnetic material is arranged in a housing accommodating the rotor at a location facing the above end face of the rotor, with its one end face disposed to encounter the permanent magnet each time the rotor makes one rotation. A magnetically sensing element is disposed opposite the other end face of the pin.

The above and other objects, features and advantages of the invention will be more apparent from the ensuing detailed description taken in conjunction with the accompanying drawings.

DETAILED DESCRIPTION

The invention will now be described in detail with reference to the drawings illustrating an embodiment thereof.

Figure 1:
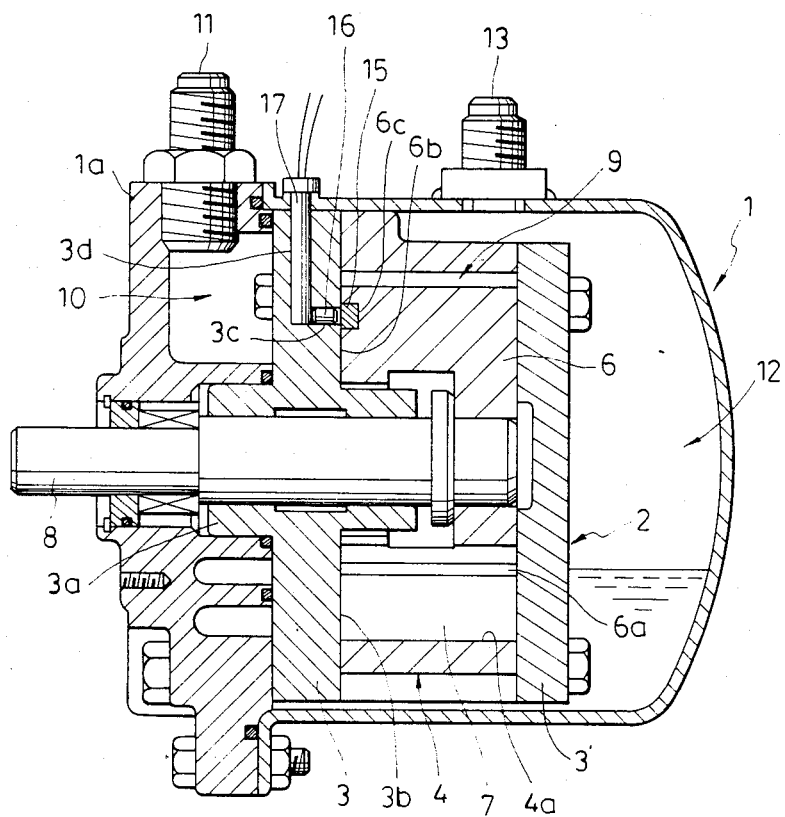
FIG. 1 is a vertical longitudinal sectional view of a vane compressor to which is applied a rotational speed sensor according to an embodiment of the invention.

Referring first to FIG. 1, a vane compressor is illustrated, to which is applied a rotational speed sensor according to the invention. Accommodated in a casing 1 is a pump housing 2 which is formed of a cam ring 4 having an oblong interior with an endless camming inner peripheral surface 4a, and a front side block 3 and a rear side block 3' secured to opposite ends of the cam ring 4. Rotatably received within the pump housing 2 is a rotor 6 which has its outer peripheral surface formed with a plurality of, e.g. four axial slits 6a circumferentially arranged at equal intervals. Vanes 7 in the form of rectangular plates are radially slidably fitted, respectively, in the slits 6a.

The rotor 6 is rigidly fitted on a rotary shaft 8 which extends rotatably supportedly through a bearing central portion 3a formed integrally with the front side block 3, for rotation about its own axis together with the rotary shaft 8. The casing 1 has a front head 1a securely mounted on the front side block 3 and defines therein a suction chamber 10 in cooperation with the front side block 3, which communicates through pump inlets, not shown, with pump working chambers 9 (only one of which is shown) during suction strokes thereof, which are defined between adjacent ones of the revolving vanes 7, the inner wall surfaces of the pump housing 2 including the camming inner peripheral surface 2a, and the outer peripheral surface of the rotor 6 during rotation of the rotor 6. An intake connector 11 is mounted through the ceiling wall of the front head 1a, which is formed therein with an intake port, not shown, opening in the suction chamber 10. A discharge pressure chamber 12 is defined within the casing 1 by the inner wall surfaces of the casing and the outer wall surfaces of the pump housing 2, and disposed for communication with the pump working chambers 9 during discharge strokes thereof through pump outlets provided with discharge valves (none of which is shown). A discharge connector 13 is mounted through the ceiling wall of the casing 1, which is formed therein with a discharge port, not shown, opening in the discharge pressure chamber 12. The ports of intake and discharge connectors 11, 13 are connected to the refrigerant circuit of an air conditioner, not shown.

The cam ring 4, the side blocks 3, 3', and the rotor 6 are each formed of a non-ferrous metal material(s) which is nonmagnetic, e.g. a nonmagnetic light alloy such as an aluminum alloy.

An end face 6b of the rotor 6 opposite an inner end face 3b of the front side block 3 is formed therein with a blind hole 6c at a predetermined location near the outer peripheral edge of the rotor 6. A permanent magnet 15, which is formed e.g. of ferrite, is embedded in the blind hole 6c and so disposed as to develop a magnetic field which is axial of the rotor 6. In the illustrated embodiment, the permanent magnet 15 is entirely force fitted within the blind hole 6c with its outer end face 15a located slightly inwardly of the end face 6b of the rotor 6 so as to prevent the inner end face 3b of the front side block 3 from being damaged by the ferrite magnet which is harder than the material of the side block 3 such as an aluminum alloy, during rotation of the rotor 6.

Figure 2:
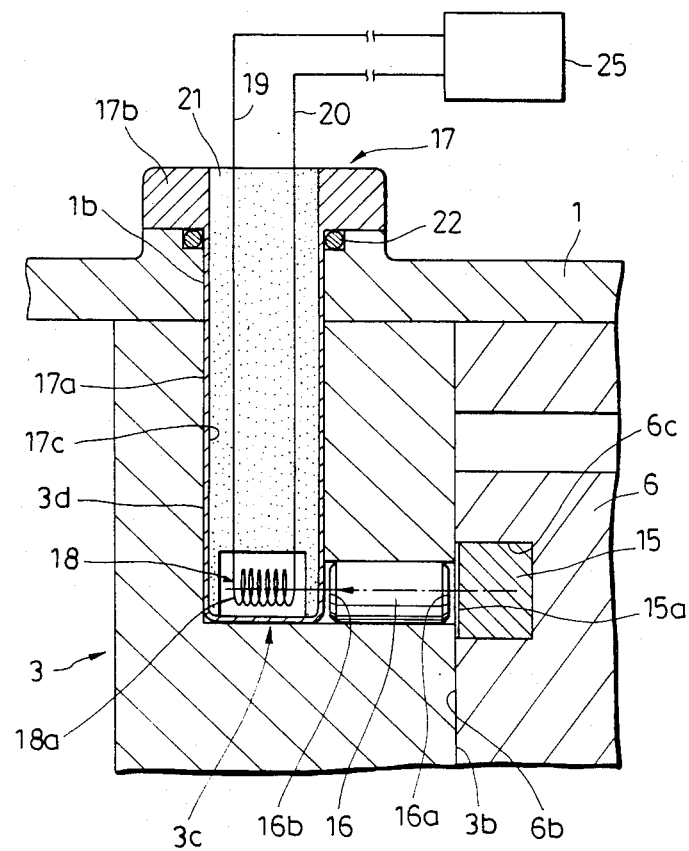
FIG. 2 is an enlarged sectional view of the rotational speed sensor in FIG. 1.

Formed in the inner end face 3b of the front side block 3 is a hole 3c which extends axially of the rotor 6 and is so radially located that it can encounter or register with the permanent magnet 15 as the rotor 6 rotates. The front side block 3 is also formed therein with a bore 3d which radially extends in the side block 3 with its one or bottom end disposed at an inner end of the axial hole 3c in communication therewith and on an extension of the axis of the hole 3c. The other or upper end of the bore 3d opens in the outer peripheral surface of the side block 3 in alignment with a through bore 1b formed in a portion of the ceiling wall of the casing 1 facing the outer peripheral surface of the side block 3. The bottom end face of the radial bore 3d is flush with a lower portion of the inner peripheral surface of the axial hole 3c. Force fitted in the axial hole 3c is a pin 16 which is formed of a ferromagnetic material such as iron, and which has its one end face 16a located slightly inwardly of the inner end face 3b of the front side block 3 as clearly shown in FIG. 2 so as to prevent damage to the end face 6a of the rotor 6 by the iron pin 16 which is harder than the rotor 6 formed e.g. of an aluminum alloy. Thus, the mutually facing end faces 15a, 16a of the magnet 15 and the pin 16 are spaced from each other by a slight distance.

A sensing element casing 17 is force fitted in the radial bore 3d of the front side block 3, and has a tip portion of its peripheral wall disposed adjacent the other end face 16b of the pin 16 with a slight gap therebetween. The casing 17 comprises a trunk portion 17a fitted through the bore 1b in the ceiling wall of the casing 1 and into the radial bore 3d, and an enlarged head portion 17b disposed over the outer surface of the ceiling wall of the casing 1. The casing 17 is formed therein with an axial hole 17c extending along the axis of the casing from the outer end face of the head portion 17b to the bottom of the trunk portion 17a. The casing 17 is preferably formed of a robust nonmagnetic material such as stainless steel, though it may be formed of a robust magnetic material.

Accommodated in the hole 17c of the casing 17 is a magnetically sensing element 18 which is formed by a coil. The coil 18 is placed on the bottom face of the hole 17c and has its axis aligned with the axis of the pin 16, with its one end face disposed opposite the end face 16b of the pin 16 via the peripheral wall of the casing 17 so as to sense an external magnetic field formed around the pin 16. The ends of the coil 18 are connected by means of conductors 19, 20 to an electrical detection circuit 25. The hole 17c of the casing 17 is filled with a synthetic material 21 for holding the magnetically sensing element 18 and the conductors 19, 20 in place within the hole 17c as well as for sealingly protecting them against external disturbances.

An annular sealing member 22 formed of an O-ring 22 is fitted on the casing 17 at a location between the head portion 17b of the casing 17 and the casing 1 to maintain airtightness betwen them.

With the above arrangement, as the rotor 6 rotates, the vanes 7 are rotated together with the rotor 6 with their tips in sliding contact with the camming inner peripheral surface of the cam ring 4, whereby pump working chambers 9 are defined by adjacent vanes 7, rotor 6 and pump housing 2, to suck refrigerant from the suction chamber 10 through the pump inlets, compress same, and discharge the compressed refrigerant through the pump outlets into the discharge pressure chamber 12. The high pressure refrigerant in the chamber 12 is supplied through the discharge connector 13 into the refrigerant circuit of the air conditioner. Each time the rotor 6 executes one rotation, the permanent magnet 15 encounters the pin 16 to cause magnetization of the pin along its axis. Since the side block 3, the rotor 6, etc. are formed of nonmagnetic materials as noted before, the magnet 15 and the pin 6 form an open magnetic circuit whereby a magnetic field is developed axially of the pin 16. When the magnetic field passes through the coil 18, a voltage is induced in the coil 18 in the form of a pulse.

The period with which a voltage or pulse is induced in the coil 18 varies in proportion to the rotational speed of the rotor 6. The detection circuit 25 determines the rotational speed of the rotor 6 from the period of an output voltage from the coil 18.

Since the magnet 15 is embedded in the end face of the rotor 6, there is no possibility of disengagement of the magnet 15 from the rotor 6 due to a centrifugal force caused by the rotation of the rotor 6.

Further, since the magnetically sensing element or pickup coil 18 is located at a side of the pin 16 remote from the rotor 6 and is accommodated within the robust casing 17 with its open end opening in the outer peripheral surface of the casing 1, it will never be subjected to high pressure refrigerant and accordingly can have a long life.

Although in the foregoing embodiment the pin 16 and the pickup coil 18 are arranged in the front side block 3, this is not limitative, but it may be arranged in the rear side block 3' instead, for instance.

A magnet, particularly a magnet formed of ferrite, is subject to large variations in magnetic characteristics such as flux density, coercive force, and magnetic permeability, in response to its temperature. Such large variations cause a corresponding change in the output voltage from the coil. Therefore, if the magnet 15 is formed by a magnetic material which has high sensitivity to temperature, such as ferrite, the sensor according to the invention may also be used as a temperature switch, as well as a rotational speed sensor, to sense the temperature of the compressor, especially that of the refrigerant, from changes in the output voltage from the pickup coil 18 which are caused by temperature-responsive changes in the magnetic characteristics of the magnet 15.

Although in the illustrated embodiment the magnetically sensing element is formed by a pickup coil, this is not limitative, but other magnetically sensing elements such as a Hall device may be employed, instead.

While a preferred embodiment of the invention has been described, variations thereto will occur to those skilled in the art within the scope of the present inventive concepts which are delineated by the following claims.

What is claimed is:

1. In a vane compressor including a rotary shaft, a rotor disposed for rotation about an axis thereof together with said rotary shaft, said rotor having an outer peripheral surface formed with a plurality of axial slits, a plurality of vanes radially slidably fitted in respective ones of said slits, and a pump housing accommodating said rotor and said vanes, wherein rotation of said rotor together with said rotary shaft causes said rotor, said vanes and said pump housing to cooperate to define pump working chambers therebetween for pumping actions of fluid, a rotational speed sensor for sensing the rotational speed of said rotor, which comprises: a permanent magnet embedded in one end face of said rotor and disposed to develop a magnetic field axially of said rotor; a pin formed of a ferromagnetic material, said pin being arranged in said pump housing at a location facing said one end face of said rotor, said pin having one end face disposed to encounter said permanent magnet each time said rotor makes one rotation; and a magnetically sensing element disposed opposite another end face of said pin.

2. A rotational speed sensor as claimed in claim 1, wherein said pump housing comprises a cam ring having an endless camming inner peripheral surface, and first and second side blocks secured to opposite ends of said cam ring, one of said first and second side blocks having one end face disposed opposite said one end face of said rotor, said one of said first and second side blocks having a first hole axially extending therein and having one end opening in said one end face thereof at a radial location encounterable with said permanent magnet, and a second hole radially extending therein and having one end disposed at another end of said first hole and on an extension of the axis of said first hole, said pin being arranged in said first hole, said magnetically sensing element being arranged in said second hole at said one end thereof.

3. A rotational speed sensor as claimed in claim 1, wherein at least one of said pump housing and said rotor is formed of a nonmagnetic metal.

4. A rotational speed sensor as claimed in claim 1, wherein said magnetically sensing element is formed of a coil, said coil having an axis thereof aligned with the axis of said pin, said coil having one end face disposed opposite said another end face of said pin.

5. A rotational speed sensor as claimed in claim 1, including a first casing in which said pump housing is accommodated, said first casing having a wall portion facing said pump housing, and a second casing accommodating said magnetically sensing element, said second casing extending through said wall portion of said first casing and into said pump housing and opening in an outer surface of said wall portion of said first casing.

6. A rotational speed sensor as claimed in claim 1, wherein said permanent magnet is formed of ferrite.

7. A vane compressor comprising: a rotary shaft; a rotor disposed for rotation about an axis thereof together with said rotary shaft, said rotor having an outer peripheral surface formed with a plurality of axial slits; a plurality of vanes radially slidably fitted in respective ones of said slits; a pump housing accomodating said rotor and said vanes; rotation of said rotor together with said rotary shaft causing said rotor, said vanes and said pump housing to cooperate to define pump working chambers therebetween for pumping actions of fluid; and a rotational speed for sensing the rotational speed of said rotor, said sensor including a permanent magnet embedded in one end face of said rotor and disposed to develop a magnetic field axially of said rotor, a pin formed of a ferromagnetic material, said pin being arranged in said pump housing at a location facing said one end face of said rotor, said pin having one end face disposed to encounter said permanent magnet each time said rotor makes one rotation, and a magnetically sensing element disposed opposite another end face of said pin.

* * * * *